United States Patent [19]

Puisais et al.

[11] Patent Number: 4,638,984
[45] Date of Patent: Jan. 27, 1987

[54] EXTERNAL APPARATUS FOR BUTT WELDING TWO PIPES

[75] Inventors: Xavier F. Puisais, Perret; Jean-Pierre Hamon, Cergy; Michel J. Jegousse, Saint-Herblain; Michel Kaluszynski, Vitry-su-Seine, all of France

[73] Assignee: Total Compagnie Francaise des Petroles, Paris, France

[21] Appl. No.: 785,648

[22] Filed: Oct. 9, 1985

[30] Foreign Application Priority Data

Oct. 22, 1984 [FR] France .................................. 84 16111

[51] Int. Cl.[4] .............................................. B23K 37/04
[52] U.S. Cl. ..................................................... 269/43
[58] Field of Search ............... 228/44.5, 49 B; 269/43, 269/48.1, 234, 217; 29/271, 272

[56] References Cited

U.S. PATENT DOCUMENTS

| 2,187,878 | 1/1940 | Hill et al. | 269/43 |
| 4,221,039 | 9/1980 | Smith | 29/271 |
| 4,492,015 | 1/1985 | Dearman | 269/43 |

Primary Examiner—Robert C. Watson
Attorney, Agent, or Firm—Sughrue, Mion, Zinn, Macpeak & Seas

[57] ABSTRACT

An external apparatus for butting two tubular elements 1, 2 to be welded together comprises two frames 8, 9 provided with means for the external gripping of the elements and which are connected by jacks 10, 11 for bringing the elements together and by a plurality of connecting and aligning means 14–19 each comprising a pair of members 20, 21 engageable one in the other with the interposition of an elastic means 22. The gripping means comprise a plurality of radial jaws 55–64 for gripping the tubular elements and carried by support rings each comprising three jaw holders 23–25 each in the form of a segment of a circle.

6 Claims, 10 Drawing Figures

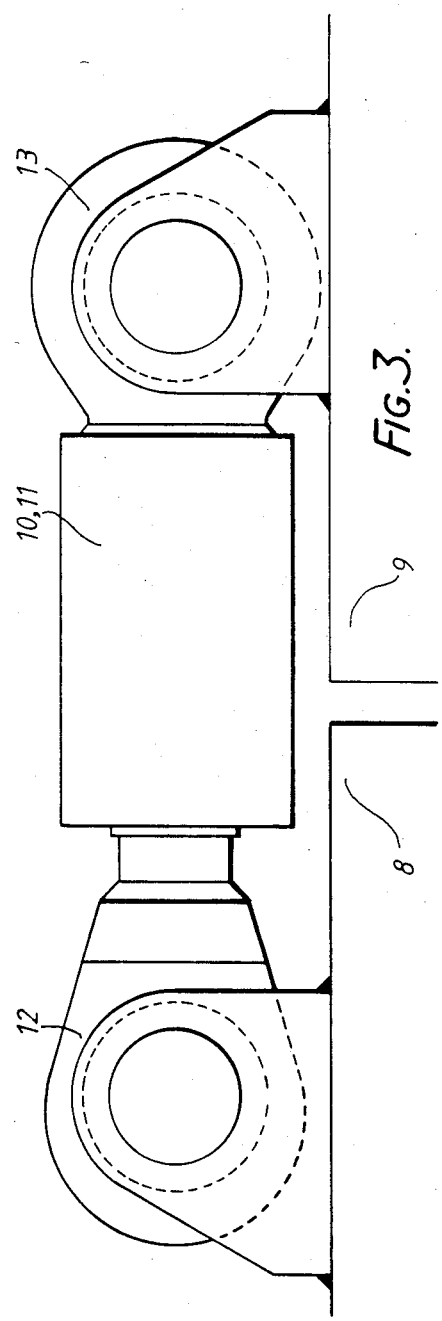
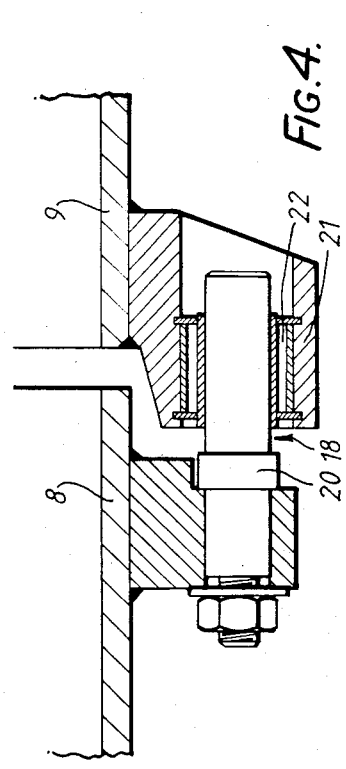

EXTERNAL APPARATUS FOR BUTT WELDING TWO PIPES

BACKGROUND OF THE INVENTION

The present invention relates to apparatus to be placed outside two tubular elements for bringing the adjacent ends of the elements opposite one another before proceeding with the operation of welding the ends together.

It is known that two tubular elements can be brought close to one another by gripping them respectively by two beds joined together by means of jacks, as described, for example, in French Pat. No. 78.33660 published under No. 2.443.008.

This system is rather cumbersome and in addition requires the installation of a separate centering system. Furthermore, if an electron-beam welding machine is used, which is disposed inside the tubular elements, it is necessary to install, outside the tubular elements and between the beds gripping the elements, autonomous dismantlable means for forming a leaktight enclosure around and on the outside of the tubular elements at the joint formed by the ends of the tubular elements when they are brought into abutment.

SUMMARY OF THE INVENTION

According to the invention there is provided external apparatus for butting two tubular elements to be joined by welding, comprising two frames, each of which is provided with means for the external gripping of a respective one of the tubular elements and which are connected to one another by articulated jacks for bringing the elements together, wherein the two frames are also connected to one another by pairs of members engagable one in the other with the interposition of an elastic means, and the gripping means comprise a plurality of radial jaws.

The jaws enable the tubular elements to be gripped with a strong clamping action, and the pairs of interengaging members effect centering, while tolerating a slight relative inclination of the two frames because of the interposition of the elastic means. The inclination is the maximum inclination which can exist between two plane end faces, which are to be welded together, of two tubular elements placed on the same axis. The maximum inclination is generally less than 1°.

The radial jaws associated with each frame are preferably disposed in a support ring, in which each jaw is slidable radially and is held by means of a wedge which is slidable axially and connected radially by slot connections to the ring and to the jaw.

To permit a greater movement of the jaws, the support ring may be divided into three jaw holders each in the form of a circular segment. The first of the jaw holders has its ends pivotally connected to the respective adjacent ends of the other two jaw holders for pivotal movement about respective pivot pins, each of which is slidable in an elongate opening provided in the frame and extending parallel to the median radius of the circular segment of the first jaw holder. The adjacent ends of the other two jaw holders are each extended by at least one arm by which these jaw holders are connected to one another through a closing jack articulated at each of its longitudinal ends to the respective arms and to the one end of at least one connecting rod pivoted at its other end on the frame at a point selected so that the movement of the arms towards or away from one another by operation of the closing jack pivots the other two jaw holders towards or away from one another, and moves the first jaw holder towards or away by translation along the openings. The other ends of each of the other two jaw holders each have a bore into which a locking finger mounted on the frame can penetrate when the three jaw holders are in the closed position.

The displacement of the three jaw holders between their open and closed positions can thus be effected in a very simple manner with the aid of a single jack. A support ring comprising three jaw holders is moreover much more compact than a ring comprising two jaw holders.

Where the support ring is divided into three jaw holders, the wedges disposed in one and the same jaw holder may all be connected to an intermediate member in the form of a portion of a ring. The frame may be provided with a system of jacks having axially movable rods connected to a connection ring provided with engagement means, with which the intermediate members are engageable so as to be moved axially with said connecting ring when the jaw holders are in the closed position.

In the case of the welding operation requiring a vacuum to be created in the region of the weld, an annular enclosing casing may be provided for application against the two tubular elements, the casing having a U-shaped section in which the legs of the U are directed radially inwardly and at their free ends carry annular seals adapted to be applied one against each of the tubular elements. The casing may be divided into three successive annular portions, each of which is attached to a different one of the three jaw holders of one of the two frames by a mechanical connection to jaws of the respective jaw holder.

Elastic adjustment means may be provided in this mechanical connection.

BRIEF DESCRIPTION OF THE DRAWINGS

An embodiment of apparatus according to the invention will now be described, by way of example only, with reference to the accompanying drawings.

In the drawings:

FIG. 3 is a view of a closing jack of the apparatus of FIG. 1;

FIG. 4 is a section through a pair of members for connection between frames of the apparatus of FIG. 1;

DETAILED DESCRIPTION OF THE PREFERRED EMBODIMENT

The embodiment described hereafter may in particular be designed for the joining of tubular elements on a floating platform for the purpose of laying a pipeline at the bottom of a stretch of water by the method known as "S laying". It may however also be used in other circumstances.

Figure 1:
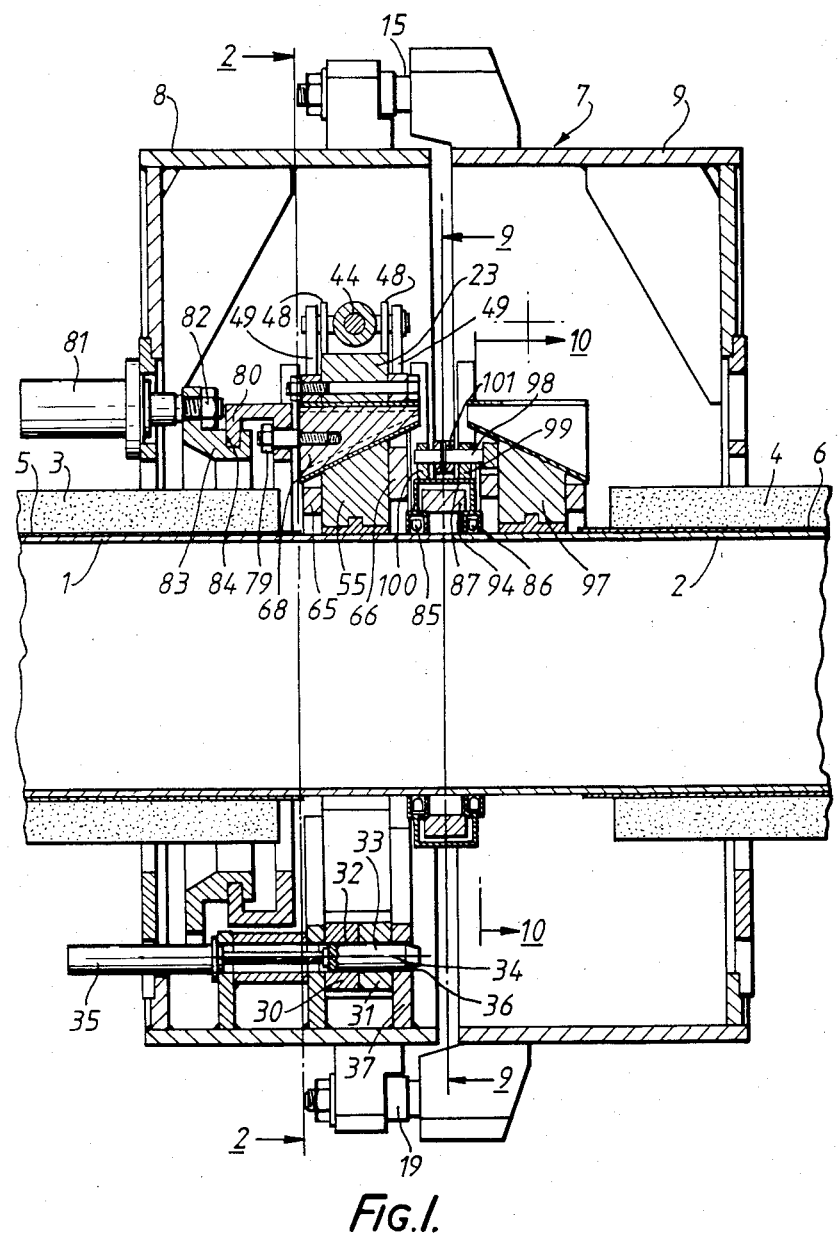
FIG. 1 is an axial section of the apparatus associated with two tubular elements which are to be joined by welding.

In FIG. 1, two tubular elements 1 and 2, which are to be butt welded together, are shown. The elements 1, 2 are covered, except in a zone close to their adjacent ends, with a concrete sheath 3, 4, with the interposition of pitch 5, 6. Butting apparatus 7 has been placed around the tubular elements so as to grip the elements in the zone which is not concreted.

The apparatus 7 comprises two frames 8, 9 in the form of boxes which are substantially symmetrical to one another. Each of the frames 8, 9 supports means for gripping one of the tubular elements and the frames 8, 9 are adapted to be brought close to one another by supplying fluid under pressure to two axially acting butting jacks 10, 11, which are visible in FIGS. 2 and 3. The ends of the jacks are provided with swivel lugs 12, 13. The jacks 10 and 11 are disposed in a diametrical plane of the pipe elements, which is here a horizontal plane.

The frames 8 and 9 are in addition connected to one another by six pairs of connection and alignment means 14, 15, 16, 17, 18, 19 comprising a male member 20 (FIG. 4) and a female member 21 carried by the frames 8 and 9 respectively. The members 20, 21 interengage with the interposition of an elastic member 22 to form connections of the "silent bloc" type. These connections have their operative parts situated on each side of one and the same transverse plane passing between the two frames 8 and 9. They permit relative centering of the frames 8 and 9, while permitting a relative inclination of 1°.

Figure 2:
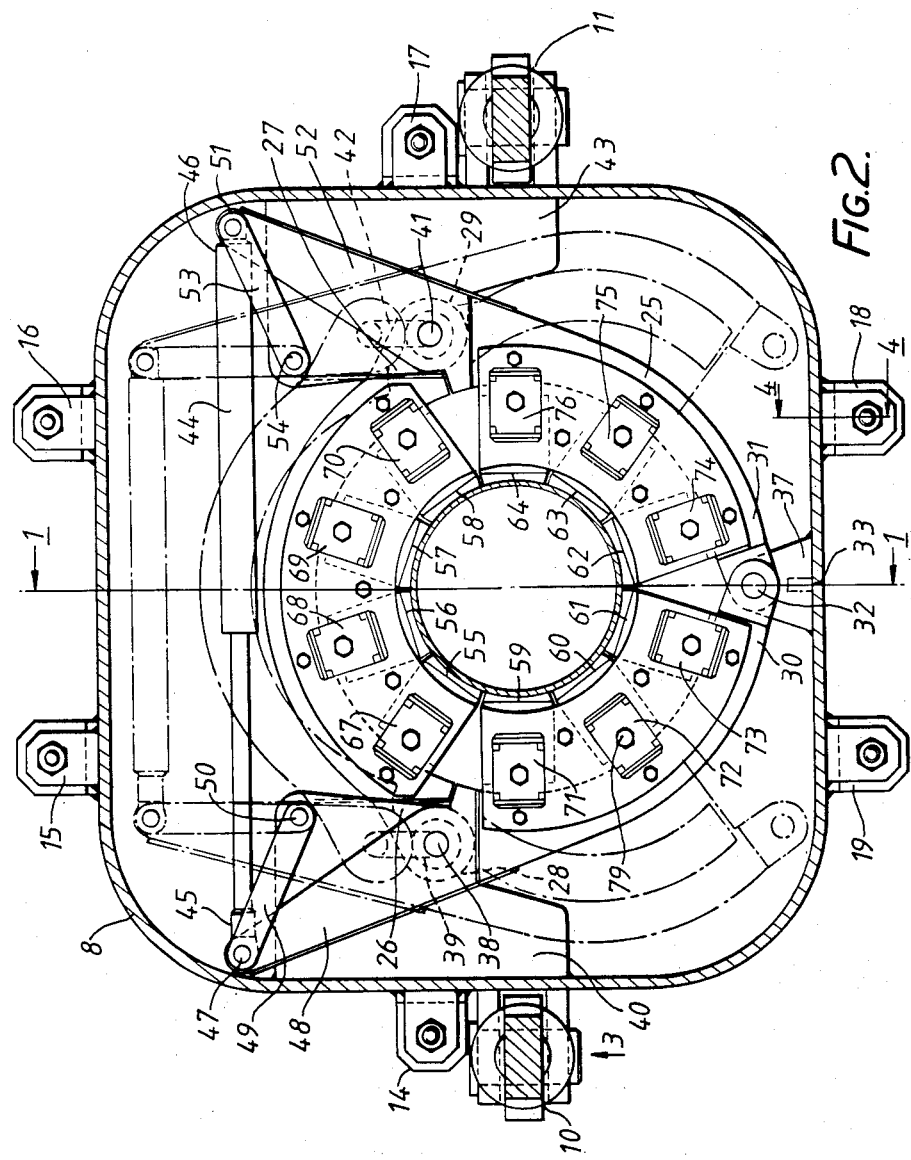
FIG. 2 is a section on the line 2—2 in FIG. 1.

FIGS. 1 and 2 show in detail the components in the frame 8, it being understood that similar components are provided in the frame 9 and that the following description relating to the frame 8 applies equally to the frame 9.

Figure 5:
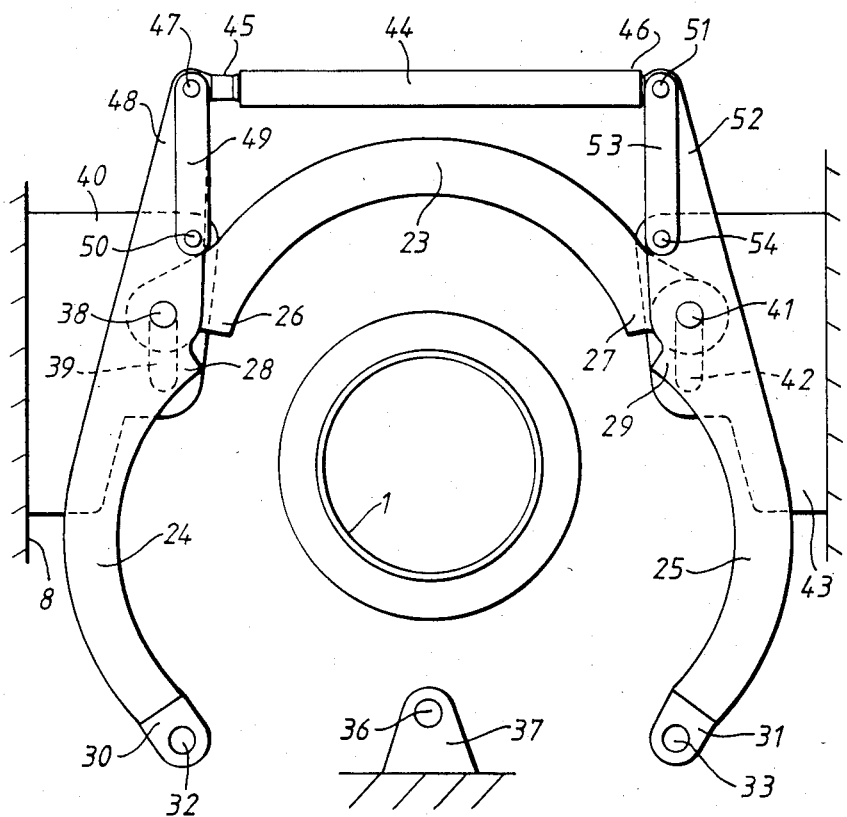
FIGS. 5 and 6 are diagrammatical illustrations of the jaw holders of the support ring, in the open and closed positions respectively.
Figure 6:
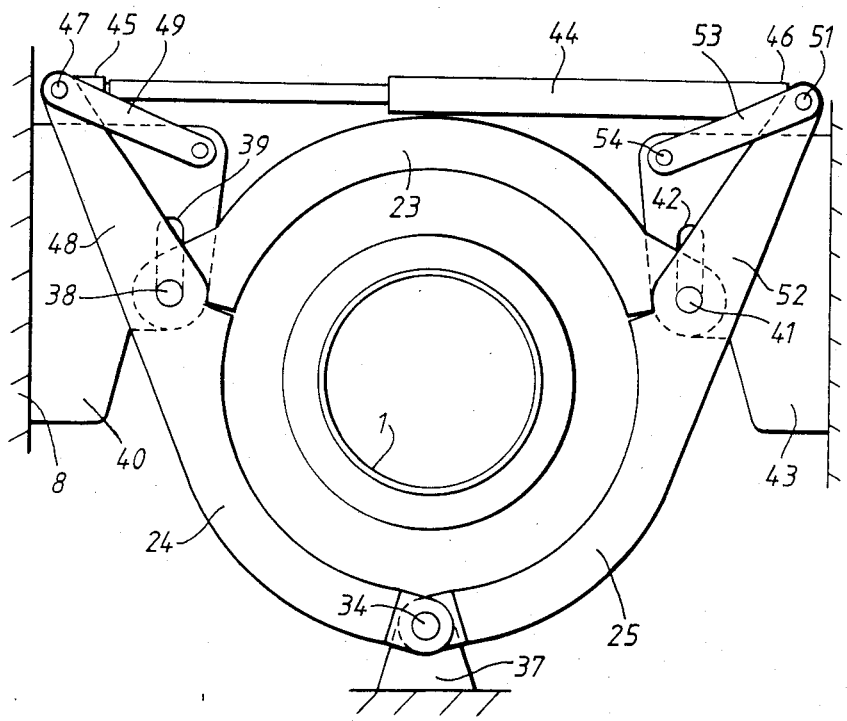

A support ring is provided in frame 8 comprising three jaw holders 23, 24, 25 (FIGS. 2, 5, 6), jaw holder 23 being pivoted at its circumferential ends 26, 27 to the adjacent circumferential ends 28, 29 of the jaw holder 24 and of the jaw holder 25 respectively. The free ends 30, 31 of the jaw holders 24 and 25 are provided with bores 32, 33 respectively into which a locking finger 34 penetrates when the support ring is in the closed position (the position in which the three jaw holders have been brought close to one another). The locking finger is operated by a locking jack 35 carried by the frame 8 and, at the same time, it penetrates into a bore 36 provided in a shoulder 37 fixed to the frame 8.

The ends 26 and 28 of jaw holders 23, 24 are pivoted about a pivot pin 38 which is guided in a vertical opening 39 provided in a plate 40 fixed to the frame 8. Similarly, the ends 27 and 29 of jaw holders 23 and 25 are pivoted about a pivot pin 41 which is guided in a vertical opening 42 provided in a plate 43 fixed to the frame 8. The jaw holder 23 can thus be raised or lowered, that is to say make a translatory movement parallel to its median radius, at the same time as the jaw holders 24 and 25 pivot to bring all the jaw holders and therefore the support ring into the opened or closed position.

This displacement is brought about by means of a closing jack 44. The longitudinal end 45 of the jack 44 is pivoted on a pin 47 at the free ends of two arms 48 fixed to the jaw holder 24 and at one end of each of two connecting rods 49, the other ends of which are pivoted at 50 on the plate 40. The other end 46 of the jack is similarly pivoted on a pin 51 at the free ends of two arms 52 fixed to the jaw holder 25 and at one end of each of two connecting rods 53 whose other ends are pivoted at 54 on the plate 43.

Each jaw holder 23, 24, 25 carries a plurality of jaws. As shown four jaws 55, 56, 57, 58 are carried by the jaw holder 23, and three jaws 59, 60, 61 and 62, 63, 64 are carried by each of the jaw holders 24 and 25 (FIG. 2). The jaws are adapted to slide radially in sockets provided in the jaw holders, between plates, such as the plates 65 and 66, held by bolts, which can be seen in FIG. 1.

Figure 7:
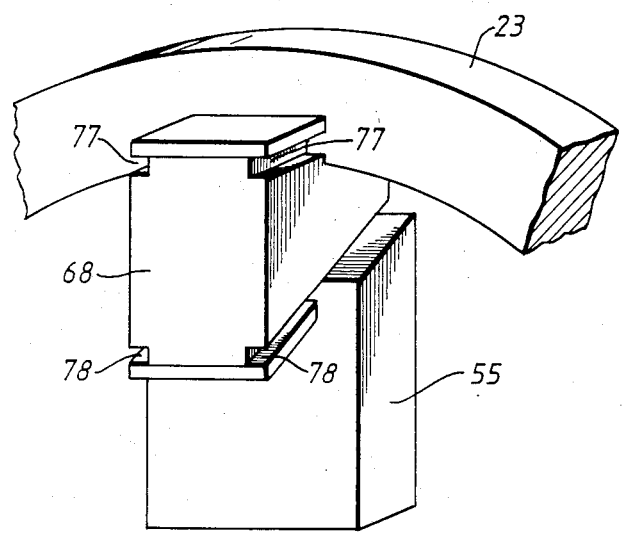
FIG. 7 is a diagrammatical illustration in perspective of the mounting of a jaw.

Wedges 67 to 76 are inserted radially between each jaw holder and each jaw carried thereby. These wedges are adapted to slide axially in T-slot systems 77 and 78 provided respectively in the jaw holders and in the jaws, as can be clearly seen in FIG. 7. These wedges hold the jaws in a radial position. As they have a contact surface which is inclined in relation to the axis of the apparatus 7, an axial displacement of the wedges results in a radial displacement of the jaws.

All the wedges disposed in any one of the jaw holders 23, 24, 25 are attached by screws 79 to one and the same intermediate member 80 which is in the form of a portion of a ring having a U-shaped section, the legs of the U being radial and turned inwards (FIG. 1). On the frame 8 are installed six axially directed clamping jacks, such as the jack 81 shown in FIG. 1, whose operating rods are connected by nuts 82 to a connecting ring 83 having an annular slot 84 open radially outwardly and engaging a leg of the U of each intermediate member 80 when the jaw holders 23, 24, 25 are in their closed position. The rods of the jacks 81 and the wedges 67 to 76 are thus connected together for axial displacement, while permitting the opening of the support ring formed by the jaw holders 23, 24, 25. The jacks 81 supply the radial clamping force necessary for the jaws 55 to 64.

Figure 8:
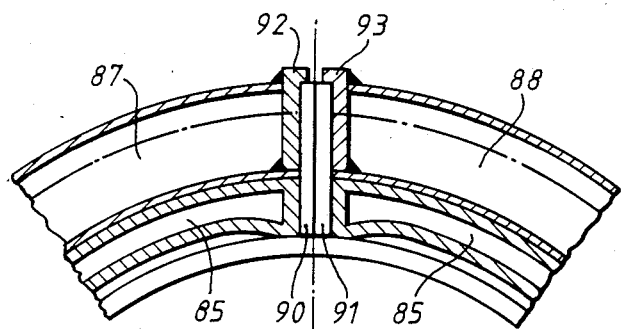
FIG. 8 is a partial cross-section taken in the region of the junction of two ring portions of an annular casing provided to form a vacuum enclosure.
Figure 9:
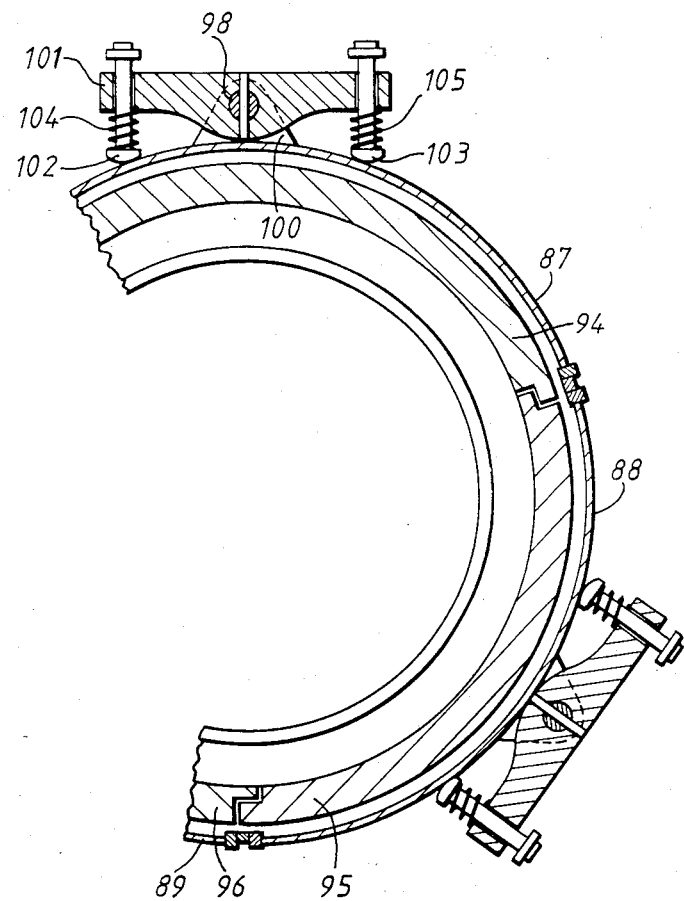
FIG. 9 is a partial section on the line 9—9 in FIG. 1.

In addition to the foregoing, a casing box is fixed to the jaws of the frame 9 and is divided into three parts in the form of portions of a ring, following one another circumferentially and corresponding to the three jaw holders 23, 24, 25, each of the parts being carried by jaws of the corresponding jaw holder. The box has a U-shaped section, with the legs of the U directed radially inwards. At their free ends the legs carry portions of inflatable annular seals 85, 86 (FIG. 1). FIG. 8 shows the position adopted by two adjacent parts 87, 88 of the casing box when the jaws are tightened, the box comprising three parts 87, 88, 89 (FIG. 9). The two adjacent parts 87, 88 end in plane faces provided with plane seals 90, 91 covering metallic end faces 92, 93 of the parts, and the ends of the portions of inflatable seals 85 or 86. The application of these plane seals 90, 91 against one another ensures leaktightness in the zone between the two adjacent parts 87, 88, and similarly between the other adjacent parts.

A steel fire shield, also divided into three parts 94, 95, 96, is inserted into the enclosure defined by the casing box parts 87, 88, 89 for cooperation with an internal electron-beam welding machine (not shown) inserted into the interior of the tubular elements 1 and 2.

In FIG. 9 it can be seen that the application of a radial force to the three parts 87, 88, 89 of the casing box is effected, for each of the parts, by means of a connection to a single jaw. As shown in FIG. 1, a jaw designated 97 carries an axially directed pin 98 which passes through two eyes 99, 100 carried by the part, such as 87, of the casing box and bears against the casing box part by means of bows 101 and support fingers 102, 103 applied elastically against the part 87 by springs 104, 105 (FIG. 9) in order to compensate for any faults of adjustment.

Figure 10:
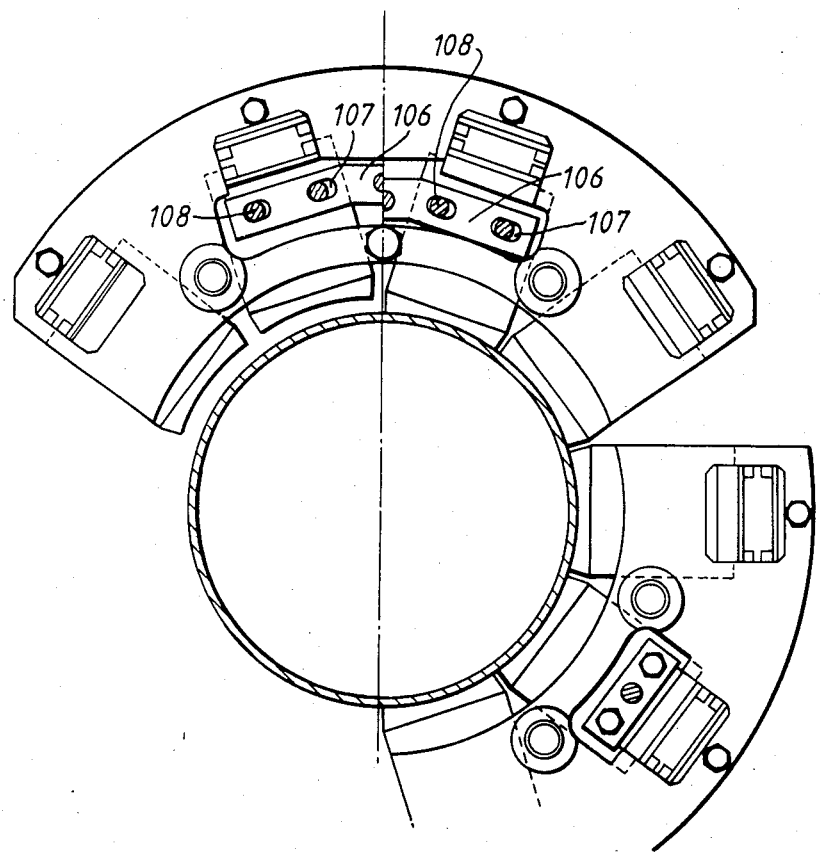
FIG. 10 is a partial section on the line 10—10 in FIG. 1.

The parts 87, 88, 89 are also each held by a two-jaw connection for reasons of symmetry. Because of the variation of diameter of the site of the connection means, a junction member 106 (FIG. 10) is interposed which is provided with oblong holes 107 in which lugs 108 connected to the jaws can slide. In FIG. 10, on the left a junction member 106 is shown in the case in which the jaws are not clamped, while on the right the junction piece 106 is shown in the case where the jaws are clamped.

One mode of utilization of the apparatus described above will now be described. It can be broken down into cycles of twelve phases, such as the following:

visual positioning of the apparatus in relation to the tubular elements;
closing and locking of the support ring of the frame 8;
clamping of the jaws of the frame 8;
closing and locking of the support ring of the frame 9;
clamping of the jaws of the frame 9;
butting of the two tubular elements by applying pressure to the butting jacks 10, 11;
inflation of the annular seals 85, 86 and production of a vacuum in the enclosure formed by the box parts 87, 88, 89;
welding operation;
connection to atmosphere of the enclosure formed by the box parts 87, 88, 89, deflation of the seals 85, 86, and partial release of the pressure in the butting jacks 10, 11;
simultaneous unclamping of the jaws of the two frames 8 and 9;
unlocking and opening of the support rings of the two frames 8, 9;
complete release of pressure in the butting jacks 10, 11.

It will be appreciated that numerous modifications can be made to the embodiment given above.

There is thus provided apparatus for butting two tubular elements, which effects at one and the same time the bringing together of the elements, with the application of very great force, and the centering and even the elimination of any ovalization of their ends. If desired, and as shown, a leaktight casing can be provided to be placed automatically around the tubular elements at the joint.

What is claimed is:

1. An externally applied apparatus for butting two tubular elements (1, 2) to be joined by welding, comprising: two frames (8, 9), each of which is provided with gripping means comprising a plurality of radially oriented jaws (55-64) for the external gripping of a respective one of the tubular elements and which are connected to one another by articulated jacks (10, 11) for bringing the elements together, wherein said two frames are also connected to one another by a plurality of circumferentially spaced pairs of alignment members (14-19), one member of each pair being carried by one frame, the other member of each pair being carried by the other frame, and the members (20, 21) of each pair being engageable one in the other with the interposition of an elastic means (22).

2. Apparatus according to claim 1, wherein said radial jaws are carried, in each said frame, by a support ring, in which each said jaw is slidable radially and is held by a wedge (67-76) which is slidable axially and connected radially to said ring and to said jaw.

3. Apparatus according to claim 2, wherein each support ring comprises three jaw holders (23-25) each in the form of a segment of a circle, a first one of said jaw holders having its ends pivotally connected to the adjacent ends of said other two jaw holders for pivotal movement about respective pivot pins (38, 41), each of which said pivot pins slides in at least one opening (39, 42) fixed relative to the frame and extending parallel to the median radius of the segment of said first jaw holder, said adjacent ends of said other two jaw holders each being extended by at least one arm (48, 52), said arms connecting said other two jaw holders by means of a closing jack (44) articulated at each of its ends to said arms and to one end of a connecting rod (49, 53) pivoted at its other end on said frame at a point (50, 54) selected so that movement of said arms towards or away from one another by the operation of said closing jack will pivot said other two jaw holders towards or away from one another and will also move said first jaw holder towards or away by translation along said openings, and the other ends of said other two jaw holders each carries a bore into which a locking finger (34) mounted on said frame is able to penetrate when said three jaw holders are in the closed position.

4. Apparatus according to claim 3, wherein said wedges disposed in one and the same jaw holder are all connected to an intermediate member (80) which is in the form of a portion of a ring, and each frame carries a system of clamping jacks (81) having axially movable rods connected to a connecting ring (83) provided with engagement means engageable with said corresponding intermediate members for axially moving said intermediate members when said jaw holders are in the closed position.

5. Apparatus according to claim 33, comprising an annular enclosing casing having a U-shaped section, the legs of said U being directed radially inwardly and at their free ends carrying annular seals (85, 86) for application against the two tubular elements respectively, wherein said casing is divided into three successive portions (87, 88, 89) of a ring, each of which is attached to a different one of said three jaw holders of one of said frames, each casing portion being connected by a mechanical connection (98, 101) to a said jaw of the respective attachment jaw holder.

6. Apparatus according to claim 5, wherein each said mechanical connection is provided with elastic adjustment means (104, 105).

* * * * *